(12) United States Patent
Le Floch

(10) Patent No.: US 7,397,928 B2
(45) Date of Patent: Jul. 8, 2008

(54) INSERTION AND EXTRACTION OF A MESSAGE IN AN IMAGE

(75) Inventor: Hervé Le Floch, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 882 days.

(21) Appl. No.: 10/735,659

(22) Filed: Dec. 16, 2003

(65) Prior Publication Data

US 2004/0146179 A1 Jul. 29, 2004

(30) Foreign Application Priority Data

Dec. 17, 2002 (FR) .................................. 02 16038

(51) Int. Cl.
*G06K 9/00* (2006.01)
*G06K 15/00* (2006.01)
*G09C 3/00* (2006.01)
*H04L 9/00* (2006.01)

(52) U.S. Cl. .................... 382/100; 380/54; 713/176; 358/3.28

(58) Field of Classification Search ........................ None
See application file for complete search history.

(56) References Cited

U.S. PATENT DOCUMENTS

| | | | | |
|---|---|---|---|---|
| 5,862,260 | A * | 1/1999 | Rhoads | 382/232 |
| 7,020,304 | B2 * | 3/2006 | Alattar et al. | 382/100 |
| 2002/0013903 | A1 * | 1/2002 | Le Floch | 713/176 |
| 2003/0011684 | A1 * | 1/2003 | Narayanaswami et al. | 348/207.99 |
| 2003/0053657 | A1 | 3/2003 | Le Floch | |

OTHER PUBLICATIONS

Brian Chen, et al., "Preprocessed and Postprocessed Quantization Index Modulation Methods for Digital Watermarking," Proc. of SPIE: Security and Watermarking of Multimedia Contents II, vol. 3971, 2000, pp. 48-59.

Brian Chen, et al., "Provably Robust Digital Watermarking," Proc. of SPIE: Multimedia Systems and Applications II, vol. 3845, 1999, pp. 43-54.

Mitchell D. Swanson, et al., "Data Hiding for Video-in-Video," 1997 International Conference on Image Processing, IEEE, Oct. 1997, pp. 676-679.

Chun-Hsien Chou, et al., "A Perceptually Tuned Subband Image Codor Based on the Measure of Just-Noticeable -Distortion Profile," IEEE Transactions on Circuits and Systems for Video Technology, vol. 5, No. 6, Dec. 1995, pp. 467-476.

Y. Chauhan, P. Gupta and K.L. Majumder: "Digital Watermarking Of Satellite Images" Indian Conference on Computer Vision, Graphics and Image Processing, Dec. 16-18, 2002, Section 2.

(Continued)

*Primary Examiner*—Charles Kim
(74) *Attorney, Agent, or Firm*—Fitzpatrick, Cella, Harper & Scinto

(57) ABSTRACT

The invention concerns a method of inserting a message in an image, the message comprising binary symbols which are each referenced by an index, characterized in that it comprises, for a coefficient ($Y_n$) of the image, the steps of:
determining (E9) a watermarked value ($Y'_n$) of the coefficient, according to the binary value (b) of a symbol of the message and according to the index (i) of the symbol,
inserting (E11) the watermarked value in place of the value of the coefficient.

24 Claims, 6 Drawing Sheets

OTHER PUBLICATIONS

Nikolaidis N et al: "Digital Image Watermarking: Overview" Proceedings of the International Conference on Multimedia Computing and Systems, Los Alamitos, Ca, US, vol. 1, Jun. 1999, pp. 1-6.

Jana Dittmann: "Digitale Wasserzeichen" 2000, Springer, Berlin, p. 46-p. 52.

* cited by examiner

INSERTION AND EXTRACTION OF A MESSAGE IN AN IMAGE

BACKGROUND OF THE INVENTION

1. Field of the Invention

The present invention concerns a method of inserting a message such as a secret watermark in a digital signal.

It also concerns a method of extracting a message inserted in a digital signal.

Correspondingly, the present invention concerns a device for inserting a message and a device for extracting the message, adapted respectively to implement the insertion and extraction methods according to the invention.

2. Description of the Related Art

The digital signal considered hereinafter will more particularly be a digital image signal.

The message insertion envisaged in the context of the invention lies in the technical field of watermarking digital data, which can be interpreted as the insertion of a watermark in the digital data making it possible for example to authenticate the content of a digital data file. This watermarking is also referred to as digital tattooing.

Watermarking in general terms comprises the modification of coefficients representing the digital image. This modification is imperceptible to the eye but can be decoded by an appropriate decoder.

The concern here is with the robust insertion of a message.

The insertion of a message is said to be robust if the message can subsequently be extracted even if the image has undergone geometric distortions such as dividing part of the image, a change of scale or a rotation.

In order to obtain such robustness, solutions have been proposed.

The document "Data Hiding for Video-in-Video" by M. D. Swanson, B. Zhu and A. H. Tewfik, which appeared in International Conference on Image Processing, 1997, p. 676-679, proposes a method of inserting a message in an image according to which an image is divided into blocks and then each of these blocks is transformed according to a transformation of the DCT type (from the English Discrete Cosine Transform).

The coefficients of the transformed blocks are then modified so that the projection of these blocks onto pseudo-random sequences is quantized according to one of two values, chosen according to the value of the binary symbol which it is wished to insert in the block.

This method is not robust to geometric distortions since the division into blocks cannot be reproduced after geometric distortion.

The document "Preprocessed and Postprocessed Quantization Index Modulation Methods for Digital Watermarking" by B. Chen and G. W. Wornell, which appeared in Security and Watermarking of Multimedia Content (E100), San Jose, January 2000, and the document "Provably Robust Digital Watermarking" which appeared in Proc. of SPIE: Multimedia Systems and Applications II, Vol. 3845, by the same authors, present a message insertion in an image according to which binary values are inserted by scalar or vector quantization of one or more pixels of the image.

For example, if scalar quantization is used, the pixel is modified into its quantized value by a first quantizer if the value to be inserted is zero or by a second quantizer if the value to be inserted is one.

The extraction is carried out by identification of the quantizer used for each pixel.

This method is not robust to geometric distortions. This is because, according to this method, the bits to be inserted are associated with the pixels of the image according to a predefined division. In the event of geometric distortion between insertion and extraction, it is no longer possible to find this division. Consequently the association between pixel and message bit can no longer be made and extraction becomes impossible.

SUMMARY OF THE INVENTION

The present invention aims to remedy the drawbacks of the prior art by providing a method and a device for inserting a message in a digital image which is robust to geometric transformations such as division, change of scale or rotation.

To this end, the invention proposes a method of inserting a message in an image, the message comprising binary symbols which are each referenced by an index, characterized in that it comprises, for a coefficient of the image, the steps of:

determining a watermarked value of the coefficient, according to the binary value of a symbol of the message and according to the index of the symbol, inserting the watermarked value in place of the value of the coefficient.

The invention makes it possible to carry out a message insertion in an image which is robust to geometric transformations such as division, change of scale or rotation. This is because a pixel of the image is modified according to the value of a binary symbol to be inserted and according to the index of this binary symbol in the message. The modified value of the pixel carries these two items of information which allow subsequent extraction of the inserted symbol, even in the case of geometric distortion.

According to a preferred characteristic, the watermarked value is selected from a range of given values determined around the value of the coefficient according to a psycho-visual model.

Thus the modification of the pixels remains invisible.

According to a preferred characteristic, the determination of a watermarked value of the coefficient comprises:

selecting a modified value of the coefficient, determining a symbol index, according to the modified value and a first predetermined function, determining the value of the message symbol corresponding to the predetermined index, verifying that the value of the symbol previously determined corresponds to the transformation of the modified value by a second predetermined function.

This makes it possible to ensure that the modified value of the pixel relates both to the information on the value of the binary symbol and its index in the message.

According to a preferred characteristic, if the value of the symbol previously determined corresponds to the transformation of the modified value by a second predetermined function, the method comprises the step of:

testing for determining whether the number of times the symbol has already been inserted in a coefficient of the image is the lowest amongst all the symbols whose index was determined according to the modified value and the first predetermined function and whose value corresponds to the transformation of the modified value by the second predetermined function, for the coefficient in question.

Thus it is the symbol which has least often been inserted in the image which will be chosen. Overall, the method tends to insert each symbol of the message the same number of times in the image.

According to a preferred characteristic, the insertion of the binary symbols is carried out on the luminance value of the pixels of the image. This gives good experimental results.

According to an alternative embodiment, the index of the symbol is automatically determined in accordance with the coefficient.

The invention also relates to a method of extracting a message from an image, the message having been inserted by the method presented above, characterized in that it comprises the steps of:
- calculating a symbol index and a binary value according to the watermarked value of the coefficient, for each coefficient of the image,
- totaling the number of each of the binary values obtained for each of the symbols,
- allocating to each symbol the binary value having the largest total.

According to a preferred characteristic, the symbol index for a coefficient is determined according to the watermarked value of the coefficient and the first predetermined function.

According to a preferred characteristic, the binary value of the symbol for a coefficient is determined according to the watermarked value of the coefficient and the second predetermined function.

According to a further embodiment, the method of extracting a message from an image, the message having been inserted by the method presented above, is characterized in that it comprises the steps of:
- calculating a symbol index according to the watermarked value of the coefficient, for each coefficient of the image,
- calculating a first and a second value according to the watermarked value, for each coefficient of the image,
- first totaling of the absolute values of the differences between the watermarked value and the first value, for each symbol,
- second totaling of the absolute values of the differences between the watermarked value and the second value, for each symbol,
- allocating to each symbol a binary value according to the smallest total amongst the first and second totals.

Correspondingly, the invention concerns a device for inserting a message in an image, the message containing binary symbols which are each referenced by an index, characterized in that it comprises:
- means of determining a watermarked value of a coefficient of the image, according to the binary value of a symbol of the message and according to the index of the symbol,
- means of inserting the watermarked value in place of the value of the coefficient.

The insertion device according to the invention comprises means of implementing the characteristics disclosed above.

The invention also concerns an extraction device comprising means of implementing the characteristics presented above.

The insertion device and the extraction method and device have advantages similar to those presented above.

The invention also concerns a digital apparatus including the device according to the invention or means of implementing the method according to the invention. This digital apparatus is for example a digital camera, a digital camcorder, a scanner, a printer, a photocopier or a facsimile machine. The advantages of the device and of the digital apparatus are identical to those disclosed above.

An information storage means which can be read by a computer or by a microprocessor, optionally integrated into the device, and optionally removable, stores a program implementing the method according to the invention.

A computer program which can be read by a microprocessor and containing one or more sequences of instructions is able to implement the methods according to the invention.

BRIEF DESCRIPTION OF THE DRAWINGS

The characteristics and advantages of the present invention will become more clear from a description of a preferred embodiment illustrated by the accompanying drawings, in which.

DETAILED DESCRIPTION OF THE PREFERRED EMBODIMENTS

Figure 1:
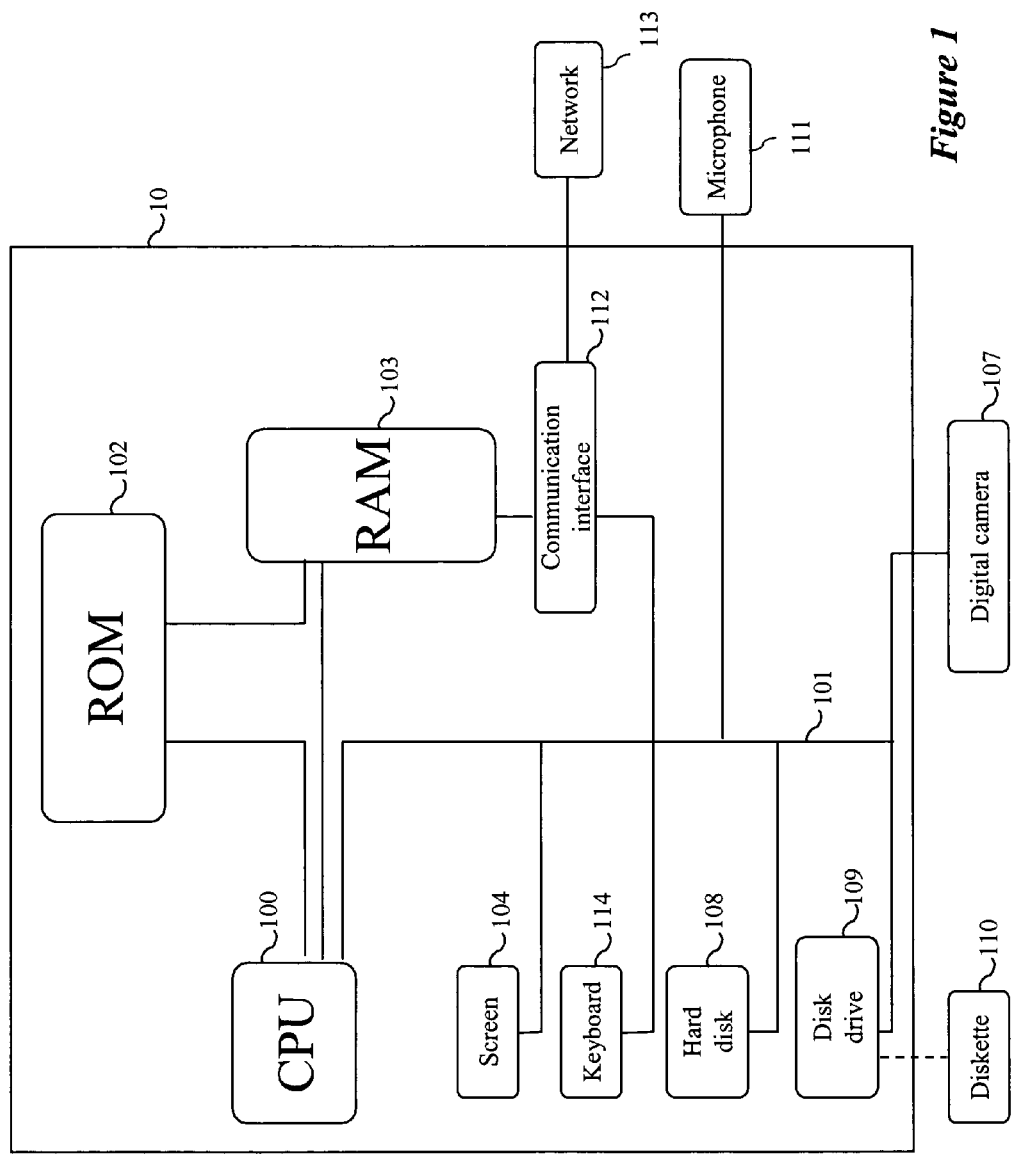
FIG. 1 is an embodiment of a device implementing the invention.

According to the chosen embodiment depicted in FIG. 1, a device implementing the invention is for example a microcomputer 10 connected to various peripherals, for example a digital camera 107 (or a scanner, or any image acquisition or storage means) connected to a graphics card and supplying information to be processed according to the invention.

The device 10 comprises a communication interface 112 connected to a network 113 capable of transmitting digital data to be processed or conversely transmitting data processed by the device. The device 10 also comprises a storage means 108 such as for example a hard disk. It also comprises a drive 109 for a disk 110. This disk 110 can be a diskette, a CD-ROM or a DVD-ROM for example. The disk 110, like the disk 108, can contain data processed according to the invention as well as the program or programs implementing the invention which, once read by the device 10, will be stored on the hard disk 108. According to a variant, the program enabling the device to implement the invention can be stored in read only memory 102 (referred to as ROM in the drawing). In a second variant, the program can be received and stored in an identical fashion to that described above by means of the communication network 113.

The device 10 is connected to a microphone 111. The data to be processed according to the invention will in this case be the audio signal.

This same device has a screen 104 for displaying the data to be processed or serving as an interface with the user, who can thus parameterize certain processing modes by means of the keyboard 114 or any other means (a mouse for example).

The central unit 100 (referred to as CPU in the drawing) executes the instructions relating to the implementation of the invention, instructions stored in the read only memory 102 or in the other storage elements. On powering up, the processing programs stored in a non-volatile memory, for example the ROM 102, are transferred into the random access memory RAM 103, which will then contain the executable code of the invention as well as registers for storing the variables necessary for implementing the invention.

In more general terms, an information storage means, which can be read by a computer or by a microprocessor, optionally integrated into the device, and optionally removable, stores a program implementing the method according to the invention.

The communication bus 101 allows communication between the various elements included in the microcomputer 10 or connected to it. The representation of the bus 101 is not limiting and in particular the central unit 100 is able to communicate instructions to any element of the microcomputer 10 directly or by means of another element of the microcomputer 10.

Figure 2:
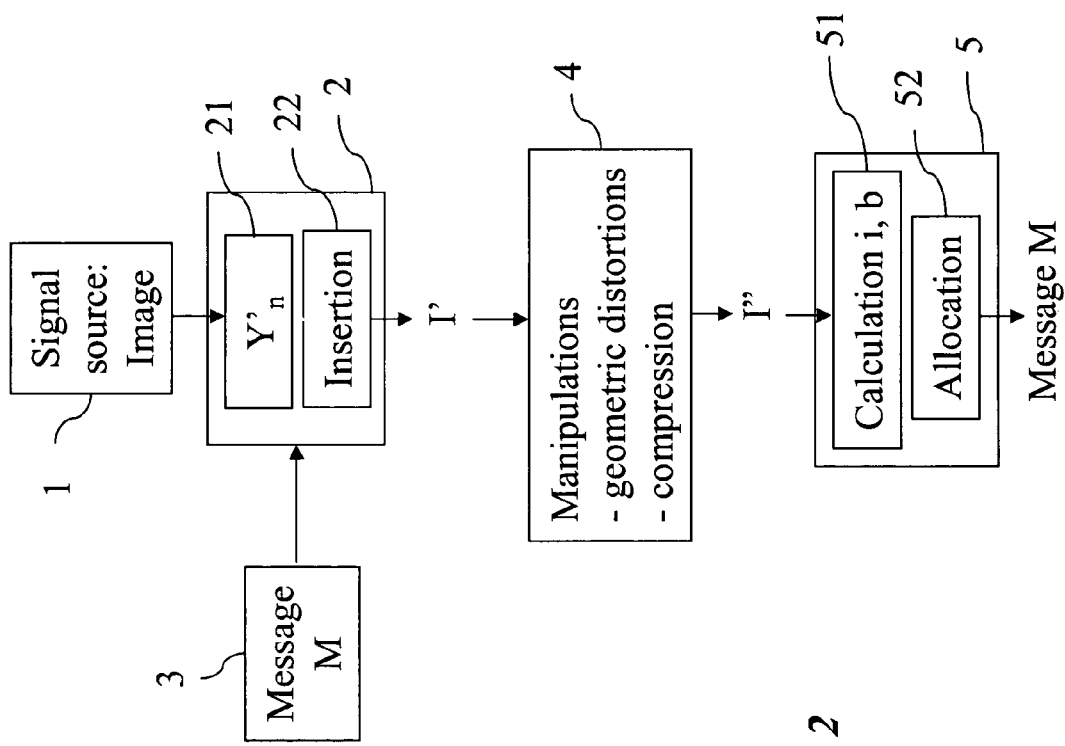
FIG. 2 depicts a device for inserting a message in an image, according to the invention, and a corresponding extraction device.

An embodiment of a device for inserting a message in an image according to the invention is described with reference to FIG. 2. The insertion device is integrated into an apparatus, which is for example a digital camera, a camcorder, a scanner, a printer, a photocopier, a facsimile machine, a database management system or a computer.

The digital image IM is supplied by a source 1. The image IM consists of a series of digital samples. An original image IM can be represented by a series of pixels coded for example in 8 bits or bytes. The black and white image IM can thus be decomposed in the spatial domain into a set of coefficients on 256 levels of gray, each coefficient value representing a pixel of the image IM.

The message M to be inserted is formed from alphanumeric characters which are converted into a binary code. This binary code is stored in a memory 3.

In general terms, an insertion device 2 can be assimilated to a coder which codes a message in an image IM. A watermarked image I' is supplied at the output of the coder 2.

The insertion device according to the invention comprises:
means 21 of determining a watermarked value $Y'_n$ of a coefficient of the image, according to the binary value of a symbol of the message and according to the index of the symbol,
means 22 of inserting the watermarked value in place of the value of the coefficient.

The functioning of the insertion device will be detailed below.

The image I' can undergo various processing steps, such as compression and decompression or geometric distortions: division, change of scale or rotation for example. These processing steps are carried out by a device 4. The result is an image I".

The image I" is supplied to a decoder 5, which carries out the extraction of the message M.

The extraction device according to the invention comprises:
means 51 of calculating a symbol index and a binary value according to the watermarked value of the coefficient, for each coefficient of the image,
means 51 of totaling the number of each of the binary values obtained for each of the symbols,
means 52 of allocating to each symbol the binary value having the highest total.

The functioning of the extraction device will be detailed below.

Figure 3:
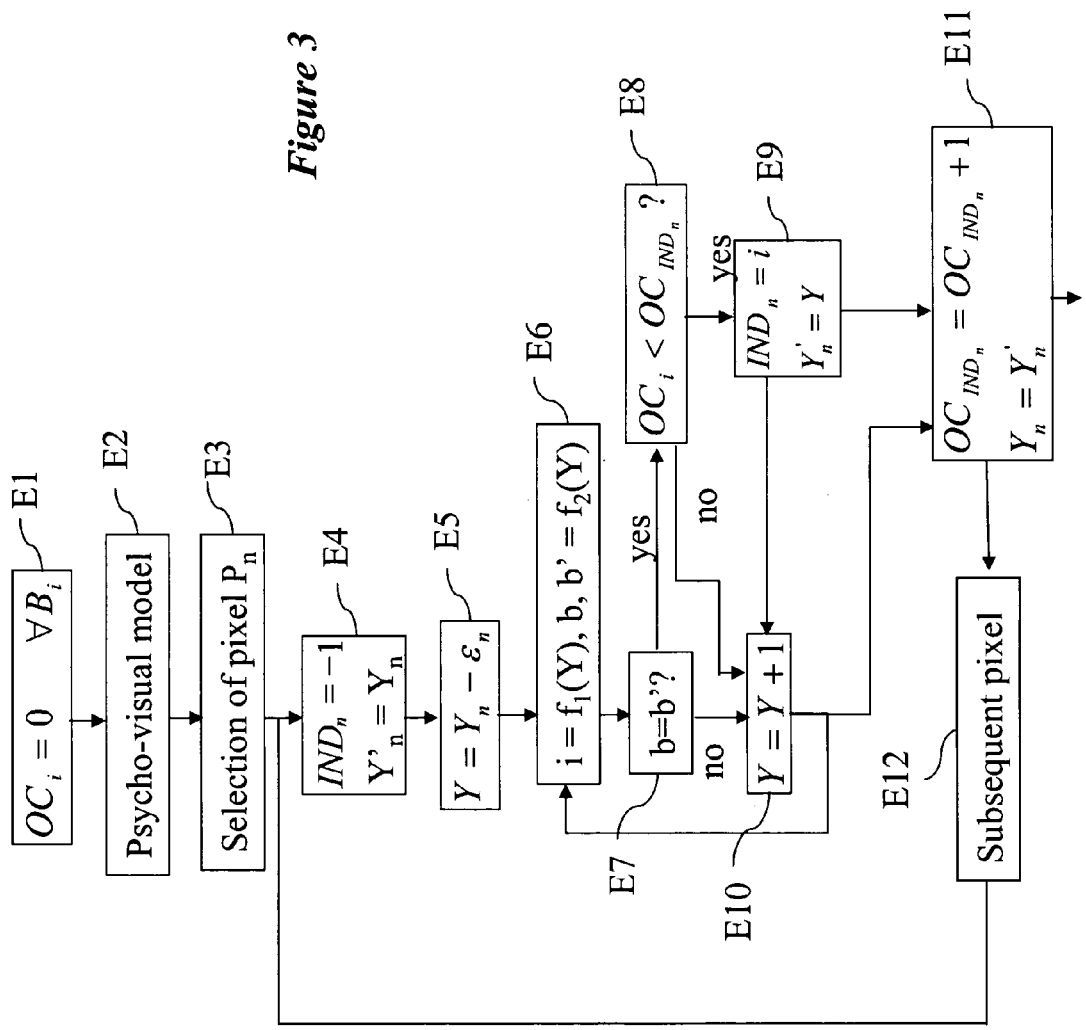
FIG. 3 depicts an embodiment of a method of inserting a message in an image, according to the invention.

FIG. 3 depicts an embodiment of a method of inserting a message in an image IM, according to the invention. This method is implemented in the coding device and comprises steps E1 to E12.

The method is implemented in the form of an algorithm which can be stored in whole or in part in any information storage means capable of cooperating with the microprocessor. This storage means can be read by a computer or by a microprocessor. This storage means is optionally integrated into the device, and may be removable. For example, it may comprise a magnetic tape, a diskette or a CD-ROM (fixed-memory compact disk).

Step E1 is an initialization at which a table OC containing as many values as there are bits in the message M to be inserted in the image IM is cleared, i.e. that every element $OC_i$ of the table OC is nullified. A value $OC_i$ of the table OC indicates the number of times the bit $B_i$ of the message has been inserted in a coefficient of the image.

The following step E2 is the calculation of a psycho-visual model MV on the image IM. The psycho-visual model MV represents in each pixel of the image the maximum modification value acceptable on the value of the pixel without this being perceptible. In English, the term "Just Noticeable Difference" (JND) is used.

This calculation is conventional. For example, the article "A Perceptually Tuned Subband Image Coder Based on the Measure of Just Noticeable Distortion Profile", by C. H. Chou and Y. C. Li, in IEEE Trans. on Circuits and Systems for Video Technology, 5(6): 467-476, 1995, describes such a method.

The result of the psycho-visual model is a maximum distortion $\epsilon_n$ at any pixel $P_n$ of the image.

The following step E3 is the selection of a pixel $P_n$ of the image. Hereinafter, the pixels are processed one by one, and are selected either in a random order or in a predetermined order, for example from left to right and from top to bottom.

In the preferred embodiment, the binary message symbols are inserted on the luminance components of the pixels. If the image is expressed by color components, it is first converted into luminance and chrominance components. In a variant, the insertion can be carried out on the color components.

Hereinafter, the luminance component $Y_n$ of each pixel $P_n$ of the image is considered.

At the following step E4, a variable $IND_n$ is initialized to the value −1. The variable $IND_n$ is associated with the current pixel $P_n$. A watermarked luminance value $Y'_n$ for the current pixel is initialized to the value $Y_n$.

At the following step E5, a luminance variable Y is initialized to the value $Y_n-\epsilon_n$. For the current pixel $P_n$, the luminance variable Y will hereinafter take all the values between $(Y_n-\epsilon_n)$ and $(Y_n+\epsilon_n)$ in steps of one unit.

The following step E6 is first of all the determination of a bit index i to be inserted on the current luminance $Y_n$. This determination is made according to the current luminance variable Y: $i=f_1(Y)$.

The index i of the bit to be inserted is determined in the following manner:

The remainder of the integer division of the current luminance Y by an integer multiple α of the length of the message is calculated. The index i is equal to the result of the integer division of this calculation by the same multiple α. The integer α represents one step.

For example, if the length of the message to be inserted is 32 bits and the integer α is equal to four, the following results are obtained:
For $Y \in [0, 4[$, $i=0$,
For $Y \in [4, 8[$, $i=1$,
For $Y \in [8, 12[$, $i=2$,
. . .
For $Y \in [124, 128[$, $i=31$,
For $Y \in [128, 132[$, $i=0$,
. . .

At step E6, the binary value b of the bit of index i is also extracted from the message.

Step E6 also comprises the determination of a second binary value b' as a function of the current luminance variable Y: $b'=f_2(Y)$.

The binary value b' is determined in the following manner:

b'=1 if the remainder of the integer division of Y by the value α is strictly less than α/2, b'=0 if the remainder of the integer division of Y by the value a is greater than or equal to α/2.

Thus, if the value α is equal to four:

b'=1 for Y in the intervals [0, 2[, [4, 6[, [8, 10[ . . . , and b'=0 for Y in the intervals [2, 4[, [6, 8[, [10, 12[ . . . .

The following step E7 is a test for determining whether the binary values b and b' determined at the previous step are equal.

If the response is negative, this means that the current luminance value Y determined at step E5 is not an acceptable watermarked value. In this case, step E7 is followed by step E10 at which the current luminance value Y is incremented by one unit as long as the limit value $(Y_n+\epsilon_n)$ has not been reached.

Step E10 is followed by the previously described step E6. When at the end of step E10 all the luminance values have been tested between $(Y_n-\epsilon_n)$ and $(Y_n+\epsilon_n)$, this step is followed by step E11, which is described below.

When the response is positive to step E7, this means that the current luminance value Y is an acceptable watermarked value. In this case, step E7 is followed by step E8, which is a test for determining whether the number of times $OC_i$ that the bit $B_i$ of the message has been inserted in a coefficient of the image is strictly less than the number of times the bit of index $IND_n$ has been inserted in a coefficient of the image.

If the response is positive, this means that the bit of index i determined at step E6 is the one which has been inserted least often in the coefficients of the image, amongst the bits determined during previous passages through step E6 and satisfying the condition of step E7, for the current pixel of the image.

When the value $IND_n$ is equal to its initialization value −1, this means that the bit of index i determined at step E6 is the first bit satisfying the condition of step E7 for the current pixel of the image.

In these two cases, step E8 is followed by step E9, at which the marked value $Y'_n$ for the current pixel $P_n$ is set to the current value Y and the variable $IND_n$ is set to the value i. Thus the bit $B_i$ of binary value b and index i is not only able to be inserted on the luminance of the current pixel but is also the bit which has been inserted least often amongst the bits insertable on the pixel in question. Thus the method seeks to insert all the bits of the message the same number of times. All the bits are inserted with the same robustness.

As long as all the possible luminance values have not been considered for the current pixel $P_n$, step E9 is followed by the previously described step E10 in order to consider a new luminance value for the current pixel.

When all the possible luminance values have been considered for the current pixel, then step E9 is followed by step E11.

At step E11, the luminance value $Y_n$ is replaced by the watermarked value $Y'_n$ determined during the last passage through step E9. In addition, the number of times $OC_i$ that the bit $B_i$ of the message has been inserted in a coefficient of the image is incremented by one unit, with here the parameter i equal to the value $IND_n$ determined during the last passage through step E9.

In the case where $IND_n$ is equal to −1 at the end of the processing of the pixel $P_n$, this means that no bit of the message can be inserted in the luminance of this pixel. The watermarked value $Y'_n$ remains equal to its initialization value $Y_n$. The number $OC_{IND_n}$ is incremented by one unit, but does not correspond to any bit of the message.

As long as all the pixels of the image have not been processed, step E11 is followed by step E12, at which a subsequent pixel is considered. Step E12 is followed by the previously described step E4.

When all the pixels of the image have been processed, then the watermarking of the image is terminated.

Figure 4:
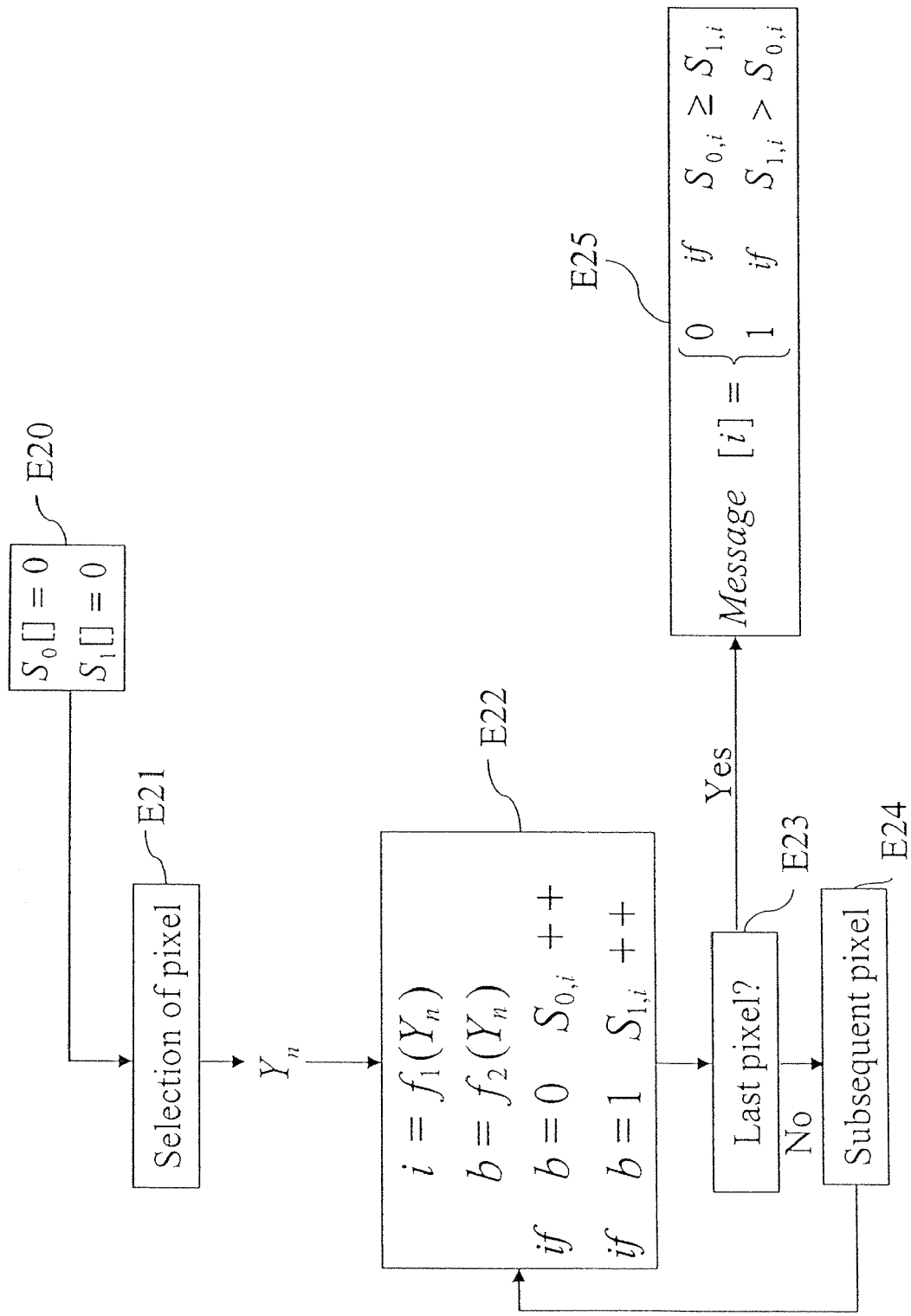
FIG. 4 depicts a first embodiment of a method of extracting a message from an image, according to the invention.

FIG. 4 depicts a first embodiment of the extraction of a message previously inserted in an image as previously disclosed.

This method is implemented in the extraction device and comprises steps E20 to E25.

The method is implemented in the form of an algorithm which can be stored in whole or in part in any information storage means capable of cooperating with the microprocessor. This storage means can be read by a computer or by a microprocessor. This storage means is optionally integrated into the device, and may be removable. For example, it may comprise a magnetic tape, a diskette or a CD-ROM (fixed-memory compact disk).

Step E20 is an initialization at which two tables, each containing as many values $S_{0,i}$ and $S_{1,i}$ as there are bits to be extracted, have their values all initialized to the value zero.

The following step E21 is the selection of a first pixel of the image. As with the insertion, the pixels are selected in a random order or in a predetermined order.

At the following step E22, a bit index i in the message and a bit value b are calculated according to the luminance value $Y_n$ of the current pixel $P_n$.

These calculations are identical to those carried out during step E6 of the insertion. In particular, the same functions $f_1$ and $f_2$ are used: $i=f_1(Y_n)$ and $b=f_2(Y_n)$.

If the value of the bit is zero, then the counter $S_{0,i}$ is incremented by one unit.

If the value of the bit is one, then the counter $S_{1,i}$ is incremented by one unit.

The following step E23 is a test for determining whether the current pixel is the last pixel of the image to be processed. If the response is negative, then this step is followed by step E24, at which a subsequent pixel is considered. Step E24 is followed by the previously described step E22.

When the response is positive at step E23, then the value of each bit of the message is determined at step E25.

For this purpose, the values $S_{0,i}$ and $S_{1,i}$ are compared for each bit of index i. If $S_{0,i}$ is greater than $S_{1,i}$, then the bit of index i receives the value zero. Conversely, if $S_{1,i}$ is greater than $S_{0,i}$, then the bit of index i receives the value one.

If the values $S_{0,i}$ and $S_{1,i}$ are zero, then the value of the corresponding bit is indeterminate.

Figure 5:
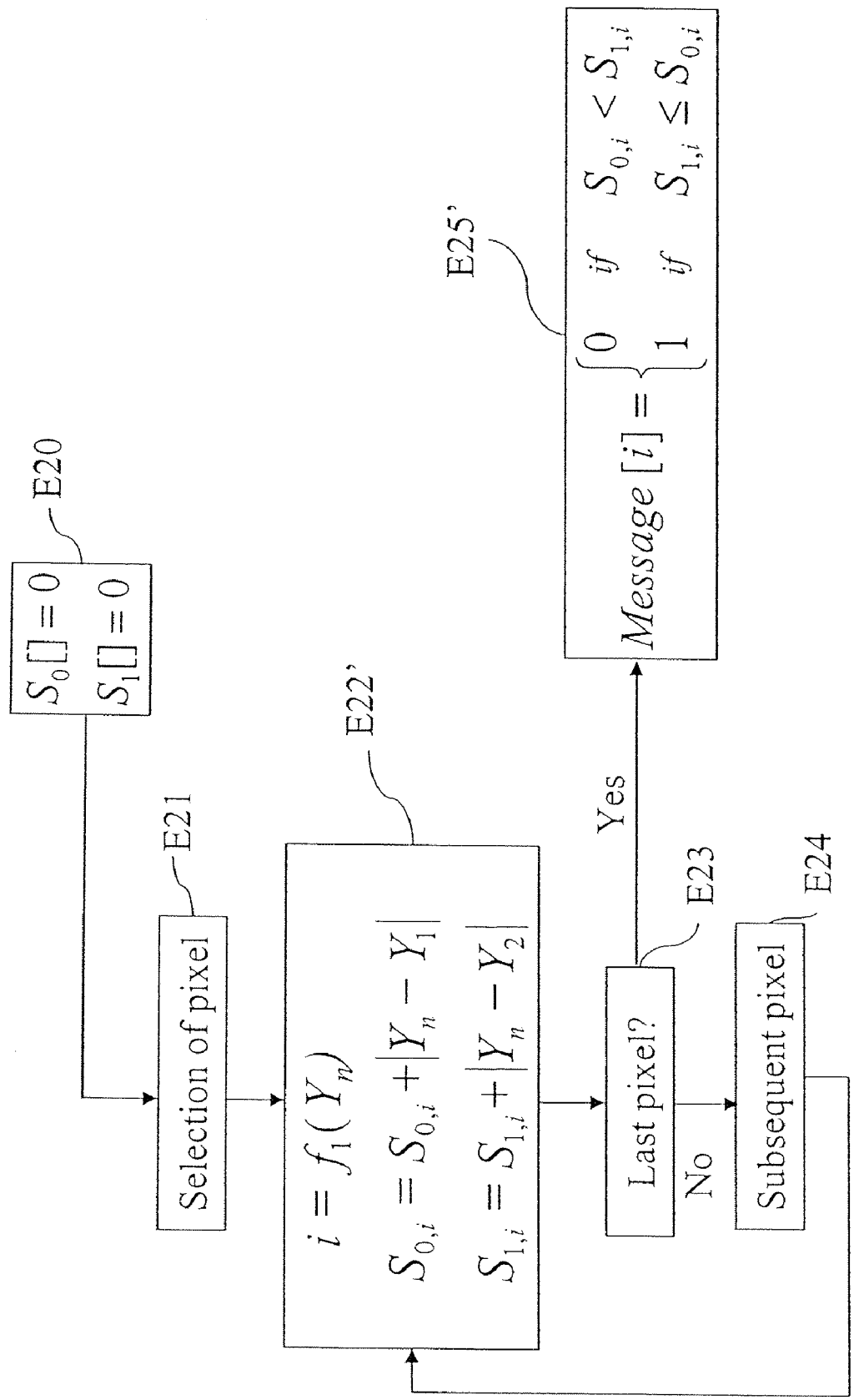
FIG. 5 depicts a second embodiment of a method of extracting a message from an image, according to the invention.

FIG. 5 depicts a second embodiment of the extraction of the message.

This embodiment is differentiated from the previous one by steps E22' and E25', which replace respectively steps E22 and E25 of the previous embodiment. The other steps are unchanged.

At step E22', the bit index i in the message is calculated according to the luminance value $Y_n$ of the current pixel $P_n$, as during step E22.

In addition, two values $Y_1$ and $Y_2$ are calculated in the following manner:

$Y_1$ is the value closest to $Y_n$ satisfying equality:

$Y_1=\alpha.n_1+3.\alpha/4$, with $n_1$ any positive integer, and $Y_2$ is the value closest to $Y_n$ satisfying equality:

$Y_2=\alpha.n_2+\alpha/4$, with $n_2$ any positive integer.

The absolute value of the difference between the current luminance value $Y_n$ and the value $Y_1$ is added to the sum $S_{0,i}$.

Likewise, the absolute value of the difference between the current luminance value $Y_n$ and the value $Y_2$ is added to the sum $S_{1,i}$.

At step E25', the value of the bit $B_i$ is zero if the sum $S_{0,i}$ is strictly less than the sum $S_{1,i}$. The value of the bit $B_i$ is one if the sum $S_{1,i}$ is less than or equal to the sum $S_{0,i}$.

If the values $S_{0,i}$ and $S_{1,i}$ are zero, then the value of the corresponding bit is indeterminate.

Figure 6:
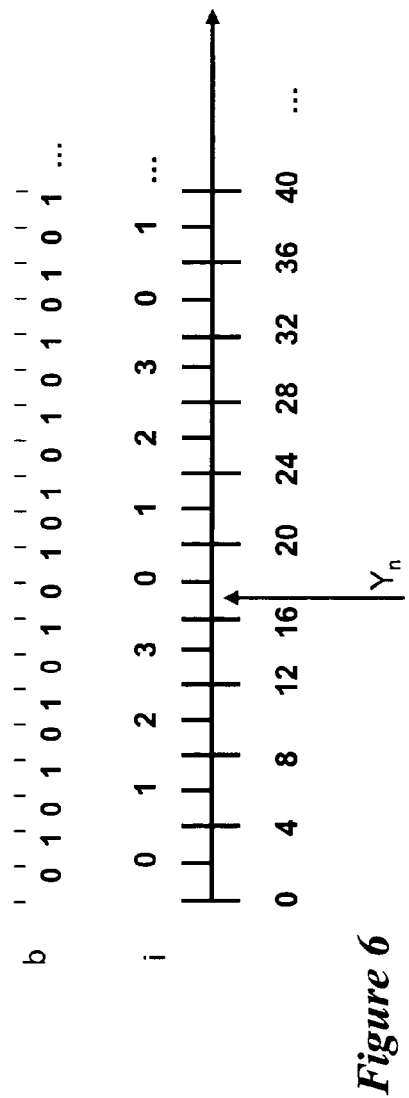
FIG. 6 illustrates an alternative embodiment of a method of inserting a message in an image, according to the invention.

FIG. 6 illustrates an alternative embodiment of an insertion method according to the invention.

In this embodiment, the index of the symbol is automatically determined in accordance with the luminance component $Y_n$:

$$i = f_1(Y_n)$$

A function $f_1$ of the same type as described above can be used. If the message to be inserted is four-bit long as exemplified on FIG. 6, the following results are obtained:

For $Y_n \in [0, 4[$, $i=0$,
For $Y_n \in [4, 8[$, $i=1$,
For $Y_n \in [8, 12[$, $i=2$,
For $Y_n \in [12, 16[$, $i=3$,
For $Y_n \in [16, 20[$, $i=0$,
. . .

The watermarked value $Y'_n$ is then determined depending on the binary value b of the message at index i (i.e. the value of bit i in the message): b=message (i).

The watermarked value $Y'_n$ is for instance determined such that $Y_n$ and $Y'_n$ remain within the same of the above intervals ($|Y_n - Y'_n| < \alpha$, here $|Y_n - Y'_n| < 4$) and $Y'_n$ has a first predetermined value if b is null and a second predetermined value if b is not null.

For example, still referring to FIG. 6, if a value $Y_n = 17$ in the original image is input, a bit corresponding to index i=0 is embedded, as f1 ($Y_n = 17$)=0.

The value $Y'_n$ is set at 17 if bit 0 is null in the message (in case b=message(0)=0) while the value $Y'_n$ is set at 19 if bit 0 is not null in the message (in case b=message (0)=1).

Similarly, if the value $Y_n$ is 22, bit 1 in the message is automatically embedded and the value $Y'_n$ is then set at either 21 or 23 (depending on the value of bit 1 in the message).

Figure 7:
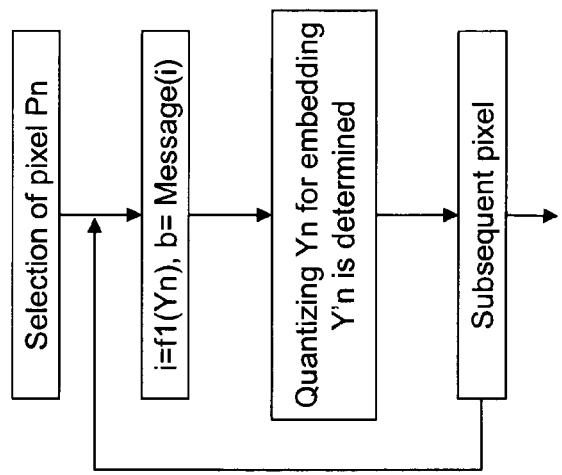
FIG. 7 is a flowchart of the method illustrated on FIG. 6.

FIG. 7 provides a flowchart showing the process which has just been described.

Naturally the present invention is in no way limited to the embodiments described and depicted, but on the contrary encompasses any variant within the capability of a person skilled in the art.

The invention claimed is:

1. A method of inserting a message in an image, the message comprising binary symbols which are each referenced by an index, comprising, for a coefficient of the image, the steps of:
   determining a watermarked value of the coefficient, according to the binary value of a symbol of the message and according to the index of the symbol in the message, wherein the index of the symbol is determined from a value of the coefficient of the image, and
   inserting the watermarked value in place of the value of the coefficient, wherein the determination of a watermarked value of the coefficient comprises:
   selecting a modified value of the coefficient,
   determining a symbol index, according to the modified value and a first predetermined function,
   determining the value of the message symbol corresponding to the determined symbol index, and
   verifying that the value of the message symbol previously determined corresponds to the transformation of the modified value by a second predetermined function.

2. An insertion method according to claim 1, wherein the watermarked value is selected from a range of values determined around the value of the coefficient according to a psycho-visual model.

3. An insertion method according to claim 1, wherein, if the value of the message symbol previously determined corresponds to the transformation of the modified value by a second predetermined function, the method comprises the step of:
   testing for determining whether the number of times the symbol has already been inserted in a coefficient of the image is the lowest amongst all the symbols whose index was determined according to the modified value and the first predetermined function and whose value corresponds to the transformation of the modified value by the second predetermined function, for the coefficient in question.

4. An insertion method according to claim 1, wherein the insertion of the binary symbols is carried out on the value of the luminance of the pixels of the image.

5. An insertion method according to claim 1, wherein said index of the symbol is automatically determined in accordance with the coefficient of the image.

6. An apparatus for processing a digital image, comprising means adapted to implement the method according to claim 1.

7. A method of extracting a message from an image, comprising the steps of:
   for each coefficient of the image, calculating a symbol index and a binary value, both according to a value of the coefficient,
   totaling the number of each of the binary values obtained for each of the symbol indexes, and
   allocating to each symbol index the binary value having the largest total.

8. An extraction method according to claim 7, wherein, for a coefficient of the image, the symbol index is determined according to the watermarked value of the coefficient and a first predetermined function.

9. An extraction method according to claim 7, wherein, for a coefficient of the image, the binary value is determined according to the value of the coefficient and a second predetermined function.

10. A method of extracting a message from an image, comprising the steps of:
    for a coefficient of the image, calculating a symbol index according to a value of the coefficient, for each coefficient of the image,
    calculating a first and a second value, both according to a value of the coefficient, for each coefficient of the image,
    first totaling of the absolute values of the differences between the value of the coefficient and the first value, for each symbol index, and
    second totaling of the absolute values of the differences between the value of the coefficient and the second value, for each symbol index,
    allocating to each symbol index a binary value according to the smallest total amongst the first and second totals.

11. An extraction method according to claim 10, wherein, for a coefficient, the symbol index is determined according to the value of the coefficient and a first predetermined function.

12. A device for inserting a message in an image, the message containing binary symbols which are each referenced by an index, comprising:

means for determining a watermarked value of a coefficient of the image, according to the binary value of a symbol of the message and according to the index of the symbol, wherein the index of the symbol is determined from a value of the coefficient of the image, and means for inserting the watermarked value in place of the value of the coefficient wherein the means of determining a watermarked value of the coefficient comprise:

means for selecting a modified value of the coefficient, means for determining a symbol index, according to the modified value and a first predetermined function, means for determining the value of the message symbol corresponding to the determined symbol index, and means for verifying that the value of the message symbol previously determined corresponds to the transformation of the modified value by a second predetermined function.

13. An insertion device according to claim 12, wherein the determination means are adapted to select the watermarked value from a range of values determined around the value of the coefficient according to a psycho-visual model.

14. An insertion device according to claim 12, comprising:

test means, if the value of the previously determined message symbol corresponds to the transformation of the value modified by a second predetermined function, for determining whether the number of times the symbol has already been inserted in a coefficient of the image is the lowest amongst all the symbols whose index was determined according to the modified value and the first predetermined function and whose value corresponds to the transformation of the modified value by the second predetermined function, for the coefficient in question.

15. An insertion device according to claim 12, being adapted to carry out the insertion of the binary symbols on the luminance value of the pixels of the image.

16. An insertion device according to claim 12, wherein said index of the symbol is automatically determined in accordance with the coefficient of the image.

17. An insertion device according to claim 12, wherein the determination and insertion means are incorporated in:

a microprocessor, a read only memory containing a program for processing the data, and a random access memory containing registers adapted to record variables modified during the execution of said program.

18. Apparatus for processing a digital image, comprising the device according to claim 12.

19. A device for extracting a message from an image, comprising:

means for calculating, for each coefficient of the image, a symbol index and a binary value, both according to a value of the coefficient, means for totaling the number of each of the binary values obtained for each of the symbol indexes, and means for allocating to each symbol index the binary value having the largest total.

20. An extraction device according to claim 19, being adapted to determine, for a coefficient of the image, the symbol index according to the value of the coefficient and a first predetermined function.

21. An extraction device according to claim 19, being adapted to determine, for a coefficient of the image, the binary value according to the value of the coefficient and a second predetermined function.

22. An extraction device according to claim 19, wherein the calculation, totaling and allocation means are incorporated in:

a microprocessor, a read only memory containing a program for processing the data, and a random access memory containing registers adapted to record variables modified during the execution of said program.

23. A device for extracting a message from an image, comprising:

means for calculating, for each coefficient of the image, a symbol index according to a value of the coefficient, means for calculating first and second values according to the value, for each coefficient of the image, means for first totaling of the absolute values of the differences between the value of the coefficient and the first value, for each symbol index, means for second totaling of the absolute values of the differences between the value of the coefficient and the second value, for each symbol index, means for allocating to each symbol index a binary value according to the smallest total amongst the first and second totals.

24. An extraction device according to claim 23, being adapted to determine, for a coefficient of the image, the symbol index according to the value of the coefficient and a first predetermined function.

* * * * *

UNITED STATES PATENT AND TRADEMARK OFFICE
CERTIFICATE OF CORRECTION

PATENT NO. : 7,397,928 B2
APPLICATION NO. : 10/735659
DATED : July 8, 2008
INVENTOR(S) : Hervé Le Floch It is certified that error appears in the above-identified patent and that said Letters Patent is hereby corrected as shown below:

Col. 1, line 21, "possible for example" should read --possible, for example,--.

Col. 2, line 4, "Consequently" should read --Consequently,--.

Col. 3, line 60, "is for example" should read --is, for example,--.

Col. 4, line 25, "on" should read --in--.

line 30, "is for example" should read --is, for example,--.

line 39, "as for example" should read --as, for example,--.

line 41, "DVD-ROM" should read --DVD-ROM,--.

line 58, "mouse" should read --mouse,--.

Col. 5, line 9, "particular" should read --particular,--.

line 16, "is for example" should read --is, for example,--.

line 21, "coded for example" should read --coded, for example,--.

line 43, "rotation" should read --rotation,--.

line 54, "symbols," should read --symbols, and--.

Col. 7, line 5, "value a" should read --value $\alpha$--.

Col. 9, line 18, "on" should read --in--.

line 28, "is for instance" should read --is, for instance,--.

UNITED STATES PATENT AND TRADEMARK OFFICE
CERTIFICATE OF CORRECTION

PATENT NO. : 7,397,928 B2
APPLICATION NO. : 10/735659
DATED : July 8, 2008
INVENTOR(S) : Hervé Le Floch It is certified that error appears in the above-identified patent and that said Letters Patent is hereby corrected as shown below:

Col. 10, line 58, "index," should read --index, and--.

Col. 11, line 7, "coefficient" should read --coefficient,--.

Signed and Sealed this

Sixth Day of January, 2009

JON W. DUDAS
*Director of the United States Patent and Trademark Office*